(12) United States Patent
Kearney et al.

(10) Patent No.: US 12,465,662 B2
(45) Date of Patent: Nov. 11, 2025

(54) ADAPTIVE FRAGRANCE DISPENSER

(71) Applicant: L'OREAL, Paris (FR)

(72) Inventors: Michael Kearney, Clark, NJ (US);
Zane Bowman Allen Miller, Seattle, WA (US); Lily Truong, Brooklyn, NY (US)

(73) Assignee: L'Oreal, Paris (FR)

( * ) Notice: Subject to any disclaimer, the term of this patent is extended or adjusted under 35 U.S.C. 154(b) by 910 days.

(21) Appl. No.: 16/917,396

(22) Filed: Jun. 30, 2020

(65) Prior Publication Data

US 2021/0402037 A1    Dec. 30, 2021

(51) Int. Cl.

| | |
|---|---|
| *A61L 9/14* | (2006.01) |
| *A45D 34/02* | (2006.01) |
| *A45D 40/00* | (2006.01) |
| *A61L 9/03* | (2006.01) |
| *A61L 9/12* | (2006.01) |
| *B05B 12/12* | (2006.01) |
| *A45D 34/00* | (2006.01) |

(52) U.S. Cl.
CPC ............ *A61L 9/14* (2013.01); *A45D 34/02* (2013.01); *A45D 40/00* (2013.01); *A61L 9/035* (2013.01); *A61L 9/125* (2013.01); *B05B 12/12* (2013.01); *A45D 2034/005* (2013.01); *A61L 2209/111* (2013.01); *A61L 2209/133* (2013.01); *A61L 2209/134* (2013.01)

(58) Field of Classification Search
CPC . A61L 9/14; A61L 9/035; A61L 9/125; A61L 2209/111; A61L 2209/133; A61L 2209/134; A45D 34/02; A45D 2034/005; B05B 12/12

USPC ...................................................... 422/105
See application file for complete search history.

(56) References Cited

U.S. PATENT DOCUMENTS

| | | | |
|---|---|---|---|
| 2014/0060150 A1* | 3/2014 | Shaw ...................... | H04W 4/21 |
| | | | 222/52 |
| 2014/0377130 A1* | 12/2014 | Edwards ................. | A61L 9/035 |
| | | | 422/5 |
| 2015/0048178 A1 | 2/2015 | Edwards et al. | |
| 2017/0249436 A1* | 8/2017 | Miller .................... | G16H 70/40 |

(Continued)

FOREIGN PATENT DOCUMENTS

| | | |
|---|---|---|
| CN | 106649511 A | 5/2017 |
| JP | 2015-228943 A | 12/2015 |

(Continued)

OTHER PUBLICATIONS

JP 2017-221640 Englsh Machine Translation from Google Patents obtained on Jun. 7, 2025, originally published in Japanese on Dec. 21, 2017. (Year: 2017).*

(Continued)

*Primary Examiner* — Christine T Mui
(74) *Attorney, Agent, or Firm* — CHRISTENSEN O'CONNOR JOHNSON KINDNESS PLLC

(57) ABSTRACT

A dispensing device comprising a body with an attachment mechanism configured to connect to a subject, a reservoir disposed inside the body, a removable selected fragrance disposed inside the reservoir, a dispenser coupled to the reservoir, a controller coupled to the dispenser and configured to dispense the selected fragrance, and a plurality of sensors on the body configured to provide data streams to a smart device.

30 Claims, 9 Drawing Sheets

(56) References Cited

U.S. PATENT DOCUMENTS

| | | | |
|---|---|---|---|
| 2018/0285923 A1 | 10/2018 | Fateh | |
| 2018/0369847 A1* | 12/2018 | Kihm | ............... A61L 9/125 |
| 2019/0008992 A1 | 1/2019 | Kihm et al. | |
| 2020/0008299 A1* | 1/2020 | Tran | ............... H05K 1/0386 |
| 2020/0237297 A1 | 7/2020 | Lazarovich | |

FOREIGN PATENT DOCUMENTS

| | | | | |
|---|---|---|---|---|
| JP | 2016-518165 A | | 6/2016 | |
| JP | 2017-221640 A | * | 12/2017 | ............ A61B 5/00 |
| KR | 10-2004-0088807 A | | 10/2004 | |
| KR | 101689761 B1 | | 12/2016 | |
| KR | 20170103618 A | | 9/2017 | |

OTHER PUBLICATIONS

International Preliminary Report on Patentability and Written Opinion mailed Jan. 12, 2023, issued in corresponding international Application No. PCT/US2021/038637, filed Jun. 23, 2021, 11 pages.

French Search Report and Written Opinion, mailed Apr. 26, 2021, issued in corresponding French Application No. 2008716, filed Aug. 26, 2020, 11 pages.

Office Action mailed Sep. 29, 2023, issued in corresponding Japanese Application No. 2022-555047, filed Jun. 23, 2021, 14 pages.

Office Action mailed Nov. 6, 2023, issued in corresponding Chinese Application No. 202180020533.4, filed Jun. 23, 2021, 24 pages.

Office Action received May 10, 2024, issued in corresponding European Application No. 21739887.4, filed Jun. 23, 2021, 8 pages.

Office Action received Mar. 8, 2024, issued in corresponding Japanese Application No. 2022-555047, filed Jun. 23, 2021, 16 pages.

Office Action mailed Mar. 30, 2024, issued in corresponding Chinese Application No. 202180020533.4, filed Jun. 23, 2021, 16 pages.

Third Chinese Office Action mailed on Aug. 26, 2024, issued in the corresponding Chinese Application No. 202180020533.4, filed Jun. 23, 2021; 20 pages.

Korean Office Action mailed on Jun. 17, 2024, issued in the corresponding Korean Application No. 10-2022-7036114, filed on Oct. 18, 2022; 5 pages.

Korean Notice of Final Rejection mailed on Dec. 3, 2024, issued in Korean Application No. 10-2022-7036114; 6 pages.

Office Action received May 16, 2025, issued in corresponding European Application No. 21739887.4, filed Jun. 23, 2021, 4 pages.

* cited by examiner

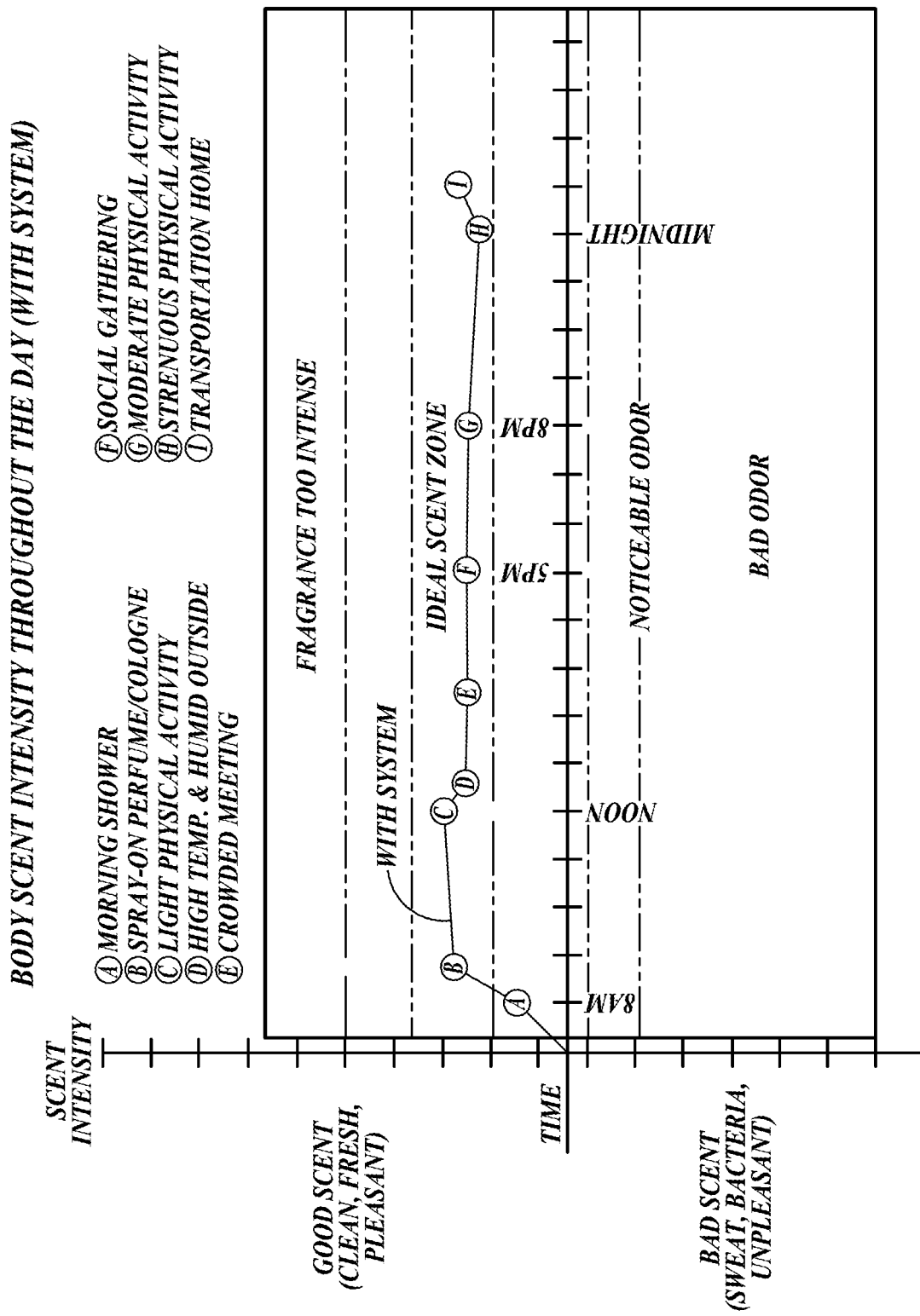

ADAPTIVE FRAGRANCE DISPENSER

SUMMARY

This summary is provided to introduce a selection of concepts in a simplified form that are further described below in the Detailed Description. This summary is not intended to identify key features of the claimed subject matter, not is it intended to be used as an aid in determining the scope of the claimed subject matter.

Humans are notorious for not recognizing their own body odors or fragrance levels. This is due to a phenomenon called "olfactory adaptation." When humans are exposed to scent for a duration of time, eventually they become desensitized to it, and even intense odors can appear normal and neutral. However, when a new person encounters a fragrance or odor that the original person has been desensitized to, that odor intensity is perceived as high.

In an embodiment, a portable dispensing device is configured to be carried by a user. The device includes: a body having a reservoir; a selected fragrance disposed inside the reservoir; a dispenser configured to dispense the selected fragrance from the reservoir; a plurality of sensors configured to acquire data related to the user; and a controller configured to activate the dispenser based on the data received from the plurality of sensors.

In another embodiment, the system also includes a smart device in communication with the controller.

In one embodiment, the reservoir is configured to contain a fragrance cartridge. In another embodiment, the selected fragrance is placed directly into the reservoir. In yet another embodiment, the selected fragrance is solid.

In one embodiment, the plurality of sensors includes at least one accelerometer, an altimeter, a humidity sensor, a heart rate monitor, a thermometer and a global positioning system (GPS) sensor.

In one embodiment, the dispenser is a solenoid-controlled sprayer. In another embodiment, the dispenser is a vent.

In one embodiment, the device includes a plurality of levers, configured to adjust the fragrance notes of the selected fragrance.

In one embodiment, the device also includes a heater configured to heat the selected fragrance.

In another embodiment, the device also includes an attachment mechanism for carrying the device.

In one embodiment, a dispensing device for adjusting personal scent of a user includes: a plurality of sensors configured to generate data based on the user's odor or surroundings; and a controller having a non-volatile computer memory with instructions that, when executed, cause a dispenser to release a selected fragrance.

In one embodiment, the system also includes a smart device communicatively coupled to the controller, wherein the smart device is configured to issue instructions to the controller.

In one embodiment, the dispensing device is a first dispensing device attached at a first location on the user, and the system further includes a second dispensing devices attached at a second location on the user.

In one embodiment, the smart device is a smart phone or a smart watch.

In one embodiment, the plurality of sensors are configured to actively monitor the subject and alert the subject when fragrance levels drop below a target level.

In one embodiment, the plurality of sensors includes a temperature sensor. In one embodiment, the plurality of sensors includes a humidity sensor. In another embodiment, the plurality of sensors includes a fragrance sensor. In yet another embodiment, the plurality of sensors includes an altimeter.

In one embodiment, the data from the plurality of sensors are collected over a period of time covering more than one day.

In one embodiment, a wearable dispensing device includes: a fragrance unit including processing circuitry operably coupled to a plurality of sensors and at least one fragrance dispenser; and the plurality of sensors configured to acquire data related to a user. The fragrance unit is configured to activate at least one fragrance dispenser based on a comparison between the data received from the plurality of sensors and a user-specific target condition.

In one embodiment, at least one of the plurality of sensors includes a sweat sensor, and the fragrance unit is configured to activate at least one fragrance dispenser based on a comparison indicative of a change in a sweat state.

In one embodiment, at least one of the plurality of sensors includes a capacitive sensor, and the fragrance unit is configured to activate at least one fragrance dispenser based on a comparison indicative of a change in a capacitance value.

In one embodiment, at least one of the plurality of sensors includes a chemical sensor, and the fragrance unit is configured to activate at least one fragrance dispenser based on a comparison indicative of a change in electrolyte or metabolite concentrations.

In another embodiment, at least one of the plurality of sensors includes a capacitive humidity sensor, and the fragrance unit is configured to activate at least one fragrance dispenser based on a comparison indicative of a change in a sweat rate.

In another embodiment, the fragrance unit is configured to activate at least one fragrance dispenser based on a comparison indicative of a change in an ion concentration.

In one embodiment, the fragrance unit is configured to activate at least one fragrance dispenser based on a comparison indicative of a change in an electrolyte or metabolite concentration.

In one embodiment, at least one of the plurality of sensors includes a skin pH sensor, and the fragrance unit is configured to activate at least one fragrance dispenser based on a comparison indicative of a change in a skin pH value.

In one embodiment, at least one of the plurality of sensors includes an electronic nose (e-Nose) sensor, and the fragrance unit is configured to activate at least one fragrance dispenser based on a comparison indicative of a change in a sweat constituent.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7B is a graph of an example subject's personal scent using the adaptive fragrance dispenser system in accordance with an embodiment of the present technology.

DETAILED DESCRIPTION

Figure 1:
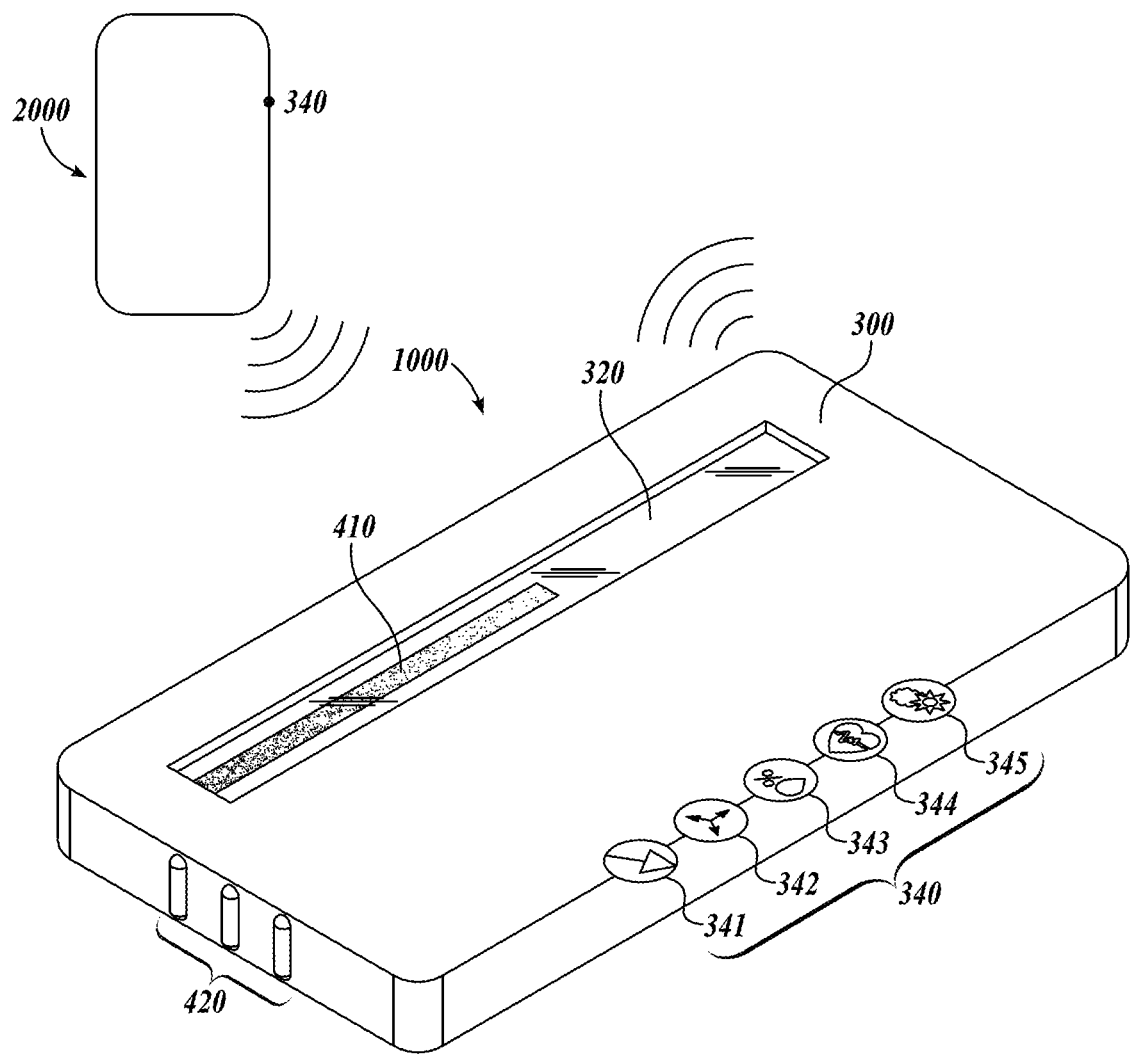
FIG. 1 is an isometric view of an example dispensing device in accordance with an embodiment of the present technology.

While preferred embodiments of the inventive technology have been illustrated and described, it will be appreciated that various changes can be made therein without departing from the spirit and scope of the invention.

In some embodiments, a dispensing device 1000 is communicatively coupled to a smart device. The dispensing device 1000 includes a sensor 340 for monitoring several data streams, i.e. a subject's heart rate, humidity, weather, location, etc. For example, the dispensing device 1000 includes an accelerometer 341, an altimeter 342, a humidity sensor 343, a heart rate monitor 344 and a thermometer 345. The dispensing device 1000 also includes a reservoir 320 for a selected fragrance in a fragrance cartridge 410. In operation, the sensors on the dispensing device 1000 transmit data to the smart device. The smart device then processes the data and alerts the subject as to when to reapply the selected fragrance which is dispensed from the dispensing device 1000.

FIG. 1 is an isometric view of an example dispensing device in accordance with an embodiment of the present technology. The dispensing device 1000 includes a body 300, a reservoir 320, and a plurality of sensors 340. In the illustrated embodiment, a fragrance cartridge 410 is stored within the reservoir 320. In other embodiments, a selected fragrance 400 may be stored directly into the reservoir 320. In some embodiments, there are levers 420 on the body 300 of the dispensing device 1000. The levers 420 on the body 300 of the dispensing device 1000 may be actuated by a subject 500, to control the dosage and release rate of certain fragrance notes of the selected fragrance 400, i.e. the body of the fragrance, floral notes, etc.

For simplicity, five sensors are illustrated in FIG. 1. In different embodiments, the dispensing device may include more or fewer sensors. In some embodiments, the sensors 340 are all placed on the body 300 of the dispensing device 1000. In other embodiments, only some of the plurality of sensors 340 are placed on the body 300 of the dispensing device 1000, while some sensors are carried by a smart device 2000 (not illustrated in FIG. 1). In some embodiments, the dispensing device 1000 includes at least one accelerometer 341, an altimeter 342, a humidity sensor 343, a heart rate monitor 344 and/or a thermometer 345. Further, in some embodiments, there may be different sensors on the body 300 of the dispensing device 1000 in addition to or instead of those illustrated in FIG. 1. A non-exhaustive list of other sensors 340 includes a volatile compound sensor, an odor level sensor, a sweat sensor, a location sensor (e.g., a global positioning system (GPS) sensor), etc. In some embodiments, a GPS sensor may be used to obtain information about relative humidity at the location. In other embodiments, a location information obtained from the GPS sensor may be used as a proxy for cultural fragrance norms.

The dispensing device 1000 is communicatively coupled to a smart device 2000 (e.g., wirelessly). In operation, the plurality of sensors 340 on the dispensing device 1000 provide data streams to the smart device 2000. The smart device 2000 may also have a plurality of sensors 340 on it. The plurality of sensors 340 on the smart device 2000 can also provide further data streams to the smart device 2000.

A subject (user) can insert a fragrance cartridge 410 containing his or her selected fragrance 400 into the reservoir 320. In some embodiments, the subject may set a desired (target) level of fragrance to be maintained. In some embodiments, the smart device 2000 can also collect data from the plurality of sensors 340 and recommend an optimal level of fragrance. The smart device may alert a subject 500 when fragrance level drops below the determined target level. Furthermore, the smart device may generate the release rate and dosage of the selected fragrance 400 to match the target level.

In FIG. 1, the smart device 2000 is depicted as a cellphone, however, in other examples, the smart device 2000 takes the form of any number of other computing devices such as a smart watch, a tablet, and the like.

The dispensing device 1000 may be communicatively coupled to the smart device 2000 via a wireless connection. In some embodiments, the wireless connection is a direct wireless connection, such as a personal area network (PAN) (e.g., BLUETOOTH®) connection, a near field communication (NFC) connection, a direct WiFi connection, or any other direct wireless connection. In some embodiments, the wireless connection is an indirect connection via one or more wireless networks, such as a cellular network (e.g., 4G, LTE), a WiFi network, a local area network, any other network, or any combination thereof. In some embodiments, the wireless connection permits the dispensing device 1000 to be located remotely from the smart device 2000.

In some embodiments, the smart device 2000 stores data generated from the plurality of sensors 340 on the dispensing device 1000 and the smart device 2000 for a duration of more than one day. The smart device 2000 can then use this data to analyze trends in a subject's individual scent levels.

Figure 2A:
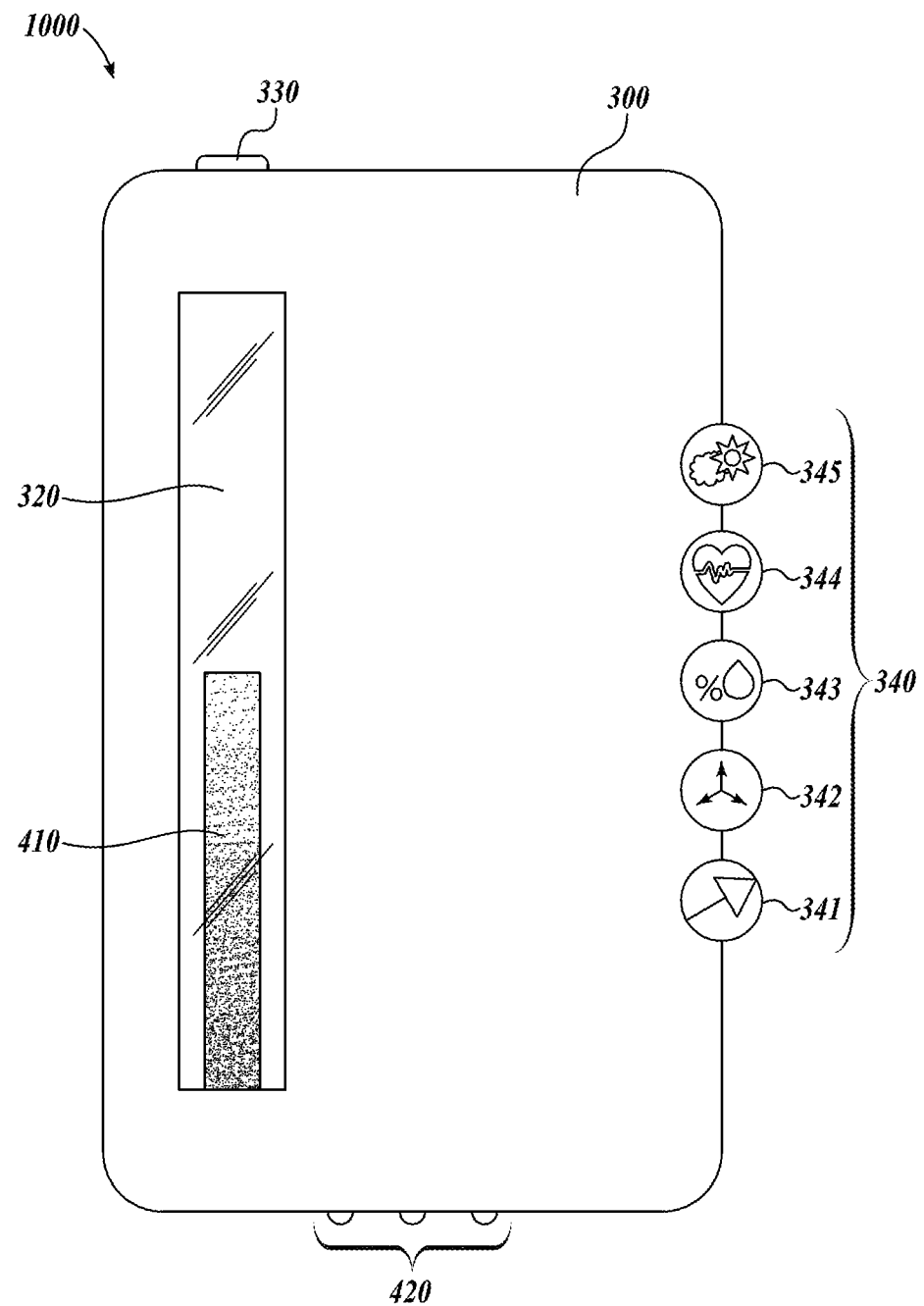
FIG. 2A is a front view of an example dispensing device in accordance with an embodiment of the present technology.

FIG. 2A is a schematic diagram of an example dispensing device 1000. The dispensing device 1000 includes a body 300, a reservoir 320 with a fragrance cartridge 410 inside of it, a plurality of sensors 340, a dispenser 330, and a plurality of levers 420. In some embodiments, sensors 340 includes at least an accelerometer 341, an altimeter 342, a humidity sensor 343, a heart rate monitor 344 and/or a thermometer 345. Such sensors may be, for example, capacitive (e.g., where readings are based on a change in electrical capacitance value), chemical (e.g., where reading is indicative of change in electrolyte, metabolite or ion concentration), skin pH-based, mechanical, or otherwise. In some embodiments, the sensors 340 may constitute an "e-Nose" sensor that indicate a change in sweat constituent (e.g., isovaleric acid, or a volatile steroid like androstenone, androstadienone, androstenol, and the like).

The fragrance cartridge 410 contains a selected fragrance 400. In some embodiments, the selected fragrance 400 is solid. In other embodiments, the selected fragrance 400 is liquid.

The fragrance cartridge 410 is configured to fit within the reservoir 320 and to connect to the dispenser 330. When a subject interacts with a smart device 2000, a dispenser 330 dispenses the selected fragrance 400 in the amount needed to achieve a target level of fragrance. In some embodiments, the dispenser 330 is a solenoid-controlled sprayer, a controlled vent or other fragrance-releasing mechanism.

Figure 2B:
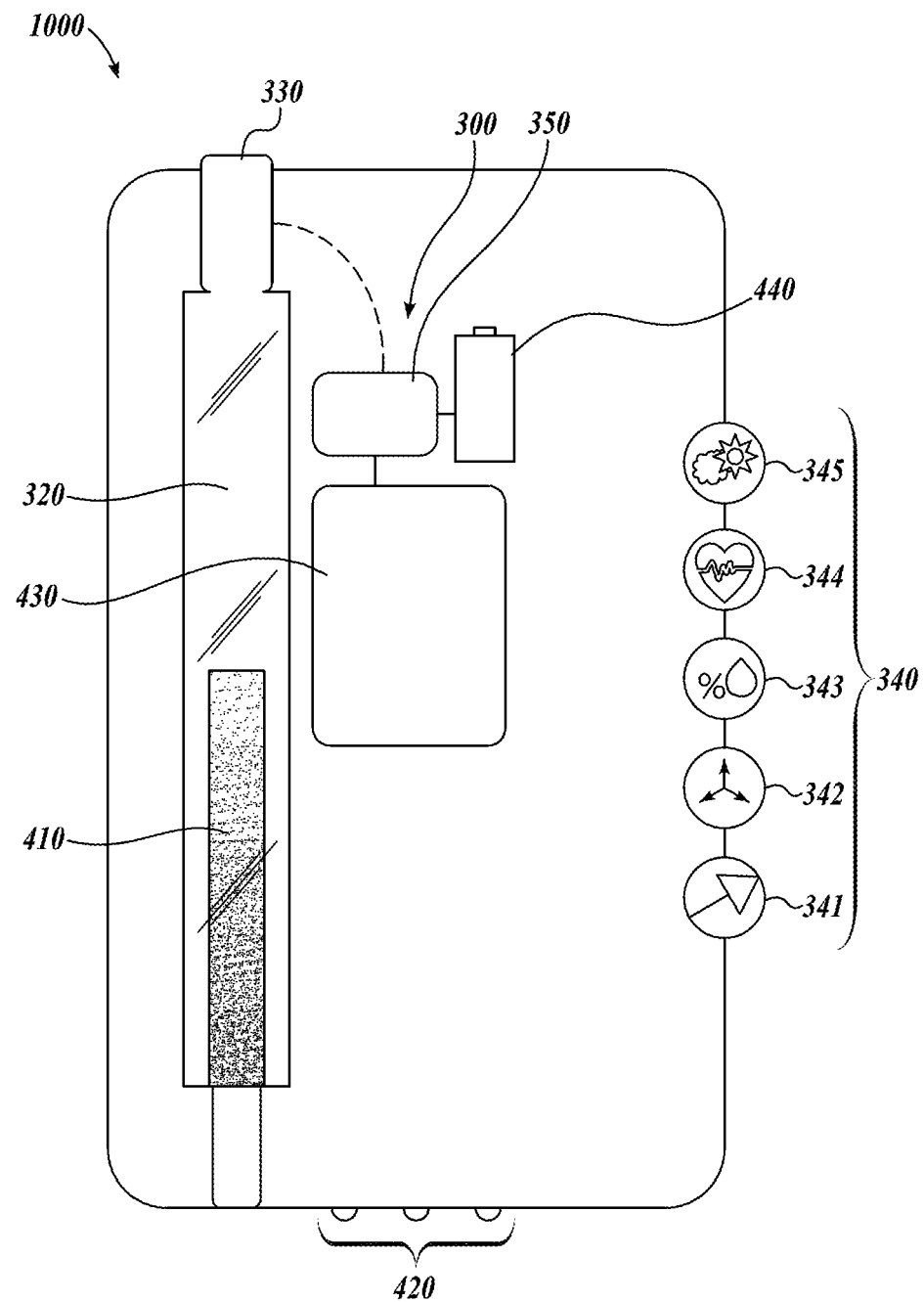
FIG. 2B is a partially schematic front view of an example dispensing device in accordance with an embodiment of the present technology.

FIG. 2B is a schematic diagram of a cross section of an example dispensing device 1000 in accordance with the present technology. The example dispensing device 1000 includes a body 300, and a fragrance cartridge 410 inside a reservoir 320 attached to a dispenser 330. The body 300 of the dispensing device 1000 includes a controller 350, a heater 430, and a battery 440, sensors 340 and levers 420. The smart device 2000, communicatively coupled with a controller 350 in the dispensing device 1000, can direct the controller 350 to release the selected fragrance to match the target level, subject to the subject's 500 input. In other embodiments, the controller 350 (e.g., CPU, digital controller, analog controller, etc.) may be included in the smart device 2000.

In some embodiments, the controller 350 may receive data from the sensors 340, process the data, and send instructions to the dispenser 330. Therefore, in some embodiments, the dispensing device 1000 may function as a smart device too, thus not requiring a separate smart device for releasing the fragrance by the dispenser 330.

In some embodiments, the selected fragrance 400 inside the fragrance cartridge 410 is in a solid phase. In operation, a heater 430 within the dispensing device 1000 may heat the solid selected fragrance 400 into a liquid or gas phase. In some embodiments, the heater 430 is an electrical heater. In other embodiments, the heater may include a source of infrared radiation. In some embodiments, the electrical heater is powered by one or more batteries 440. In some embodiments, the solid selected fragrance 400 is heated by the heater 430 into a volatile state that can waft through a vent dispenser 330.

In some embodiments, the controller 350 and the dispenser 330 are also powered by the battery 440. In an embodiment, the battery 440 is a rechargeable battery configured to receive electrical power from an external source, when for example, electrical potential of the rechargeable battery 440 has been depleted. In other embodiments, the battery 440 is a single use battery.

Figure 2C:
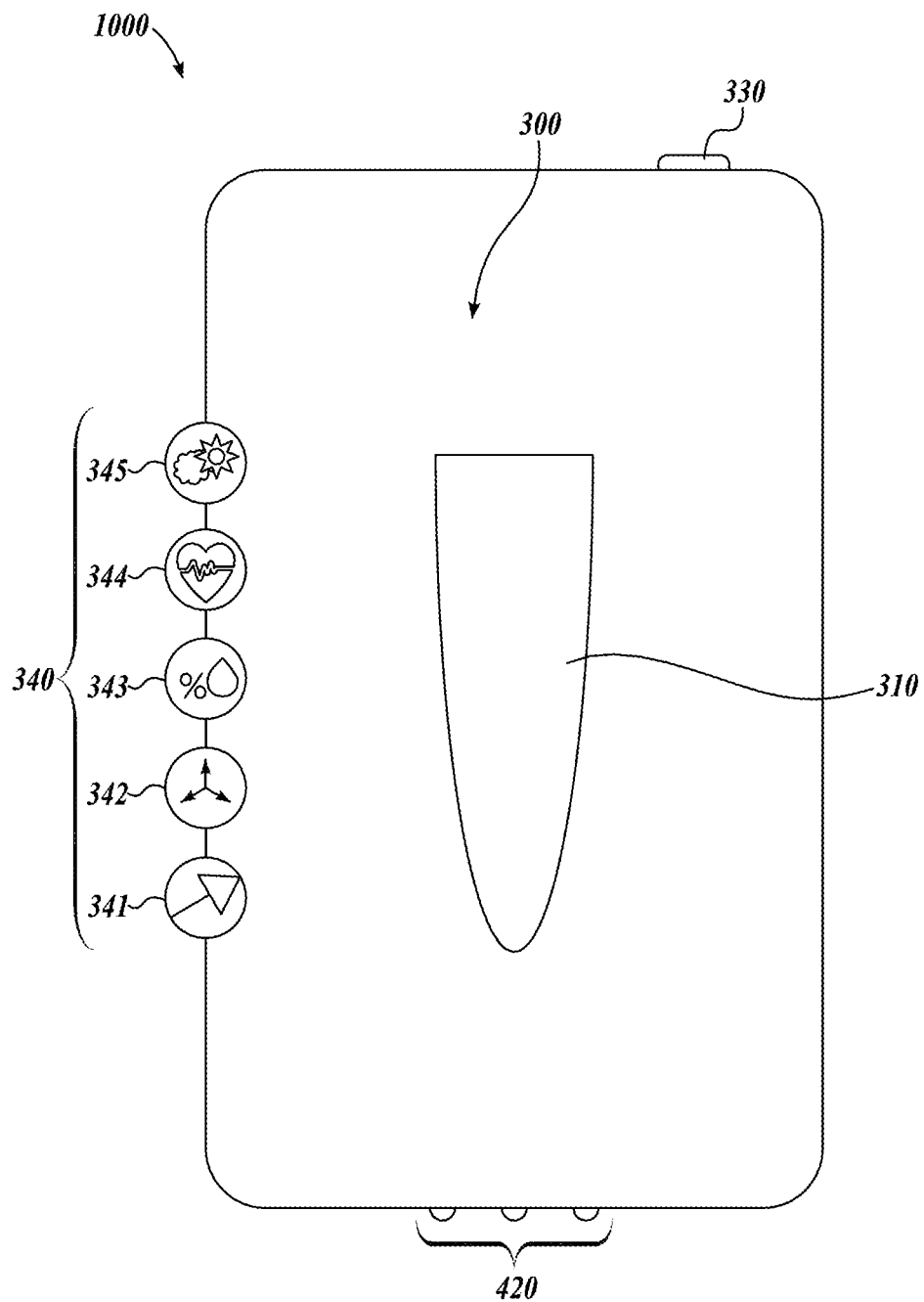
FIG. 2C is a schematic diagram of the back of an example dispensing device in accordance with an embodiment of the present technology.

FIG. 2C is a schematic diagram of the backside of an example dispensing device 1000 in accordance with the present technology. The dispensing device 1000 includes a body 300 with levers 420, a plurality of sensors 340, and an attachment mechanism 310. In the illustrated embodiment, the attachment mechanism 310 is a clip for attaching to clothing, for example by clipping the device 1000 onto a pocket. In other embodiments the attachment mechanism 310 may attach to a subject in another way, i.e. with a magnet, by sewing the dispensing device 1000 into clothing, etc.

In operation, the dispensing device 1000 can stay attached to the subject's clothing throughout the day, while the sensors 340 on the dispensing device 1000 collect data, which is sent to the smart device 2000. In some embodiments, the subject carries multiple dispensing devices, such that the sensors 340 can collect data from multiple locations on the subject.

Figure 3:
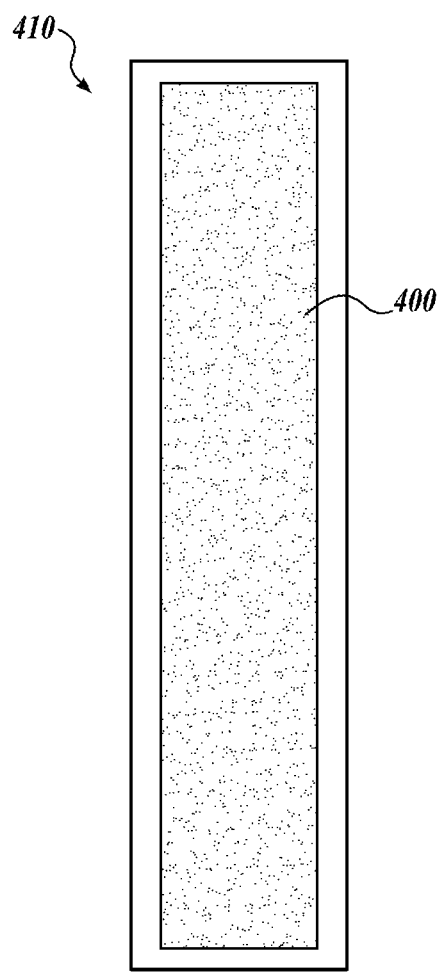
FIG. 3 is a schematic diagram of an example fragrance cartridge in accordance with an embodiment of the present technology.

FIG. 3 is an example fragrance cartridge 410 in accordance with the present technology. In some embodiments, the selected fragrance 400 is placed directly into the reservoir 320 of the dispensing device 1000, in other embodiments, the selected fragrance 400 is contained in a fragrance cartridge 410. The fragrance cartridge 410 can be pre-loaded with the selected fragrance 400 and may contain information coded into, e.g., a non-volatile computer memory, to gauge how full the fragrance cartridge 410 is, what fragrance is inside of the fragrance cartridge 410, and/or what intensity or dosage is appropriate for a given fragrance 400. In some embodiments, a subject 500 obtains an empty fragrance cartridge 410 and fills it with a selected fragrance of their choice.

In some embodiments, throughout the day, the smart device 2000 alerts the subject 500 to dispense more of the selected fragrance 400 to achieve a target scent. In some embodiments, the smart device 2000 also alerts the subject 500 as to when the fragrance cartridge 410 is low and/or empty.

In some embodiments, the subject 500 disposes of the empty fragrance cartridge 410 and replaces it with a new fragrance cartridge 410 containing the same or a different selected fragrance 400. In other embodiments, the subject 500 refills the empty fragrance cartridge 410 with the same or a different selected fragrance 400. In some embodiments, the subject 500 may mix multiple selected fragrances 400 in a single fragrance cartridge 410 to further personalize his or her fragrance.

Figure 4:
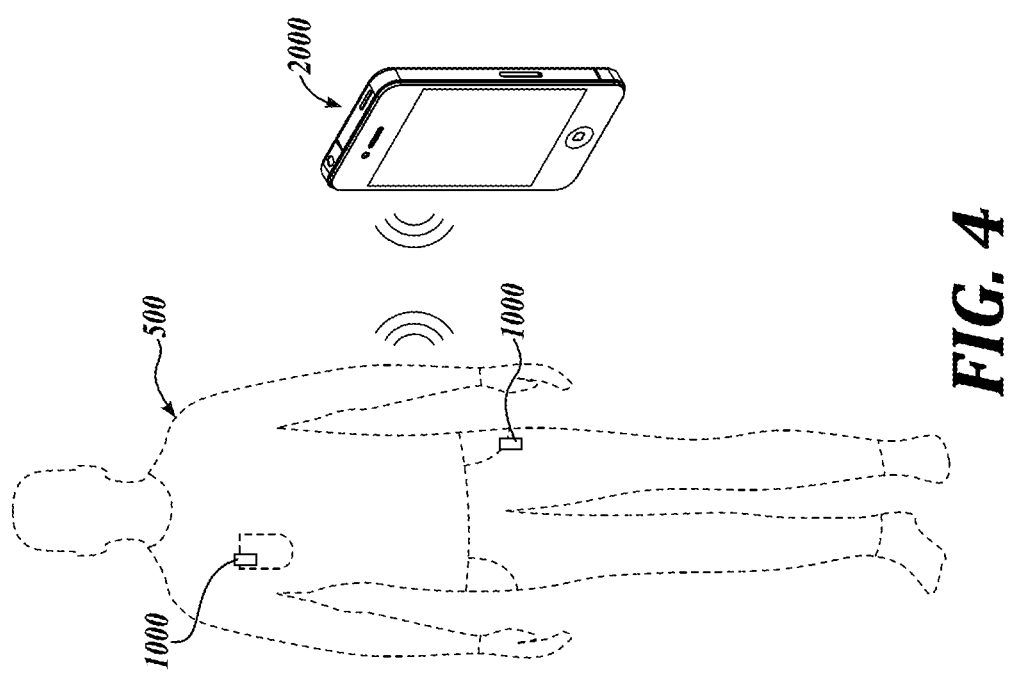
FIG. 4 is an embodiment of dispensing devices communicatively coupled with a smart device in accordance with an embodiment of the present technology.

FIG. 4 is an example of the dispensing device 1000 communicatively coupled to a smart device 2000. In some embodiments, a subject 500 has multiple portable dispensing devices 1000 carried by his or her body at different locations. The dispensing devices 1000 may communicate to the smart device 2000 via a wireless connection as explained above.

For simplicity, two dispensing devices 1000 are illustrated, but in other embodiments, additional devices may be communicatively coupled to the smart device 2000. In operation, each dispensing device 1000 may gather data independently through their respective sensors 340. The dispensing devices 1000 may be controlled by the smart device 2000 through a controller 350 to dispense fragrances at the same dosage and intensity, or at different dosages and intensity to maintain a subject's 500 desired scent. In some embodiments, the controller 350 is included in the smart device 2000. In operation, the controller 350 may wirelessly send instructions to the dispenser 330 on the dispensing device 1000. In some embodiments, a subject 500 may insert a different selected fragrance 400 into each dispensing device 1000 to further personalize their desired fragrance. In some embodiments, the plurality of sensors 340 are the same on each dispensing device 1000. In other embodiments, dispensing devices 1000 include different sets of sensors 340.

The smart device 2000 may store the data generated from the plurality of sensors 340 from each dispensing device 1000 separately or together. In some embodiments, the smart device 2000 stores the data generated from each dispensing device 1000 for a predetermined period of time, e.g., more than one day. The stored data can be used to analyze a subject's 500 personalized scent levels and preferences. The stored data can also be used to algorithmically predict when the selected fragrance 400 should be dispensed to better adapt to the subject's 500 body and lifestyle. The stored data can also be used to provide recommendations to the subject 500 regarding his or her desired scent levels.

Figure 5:
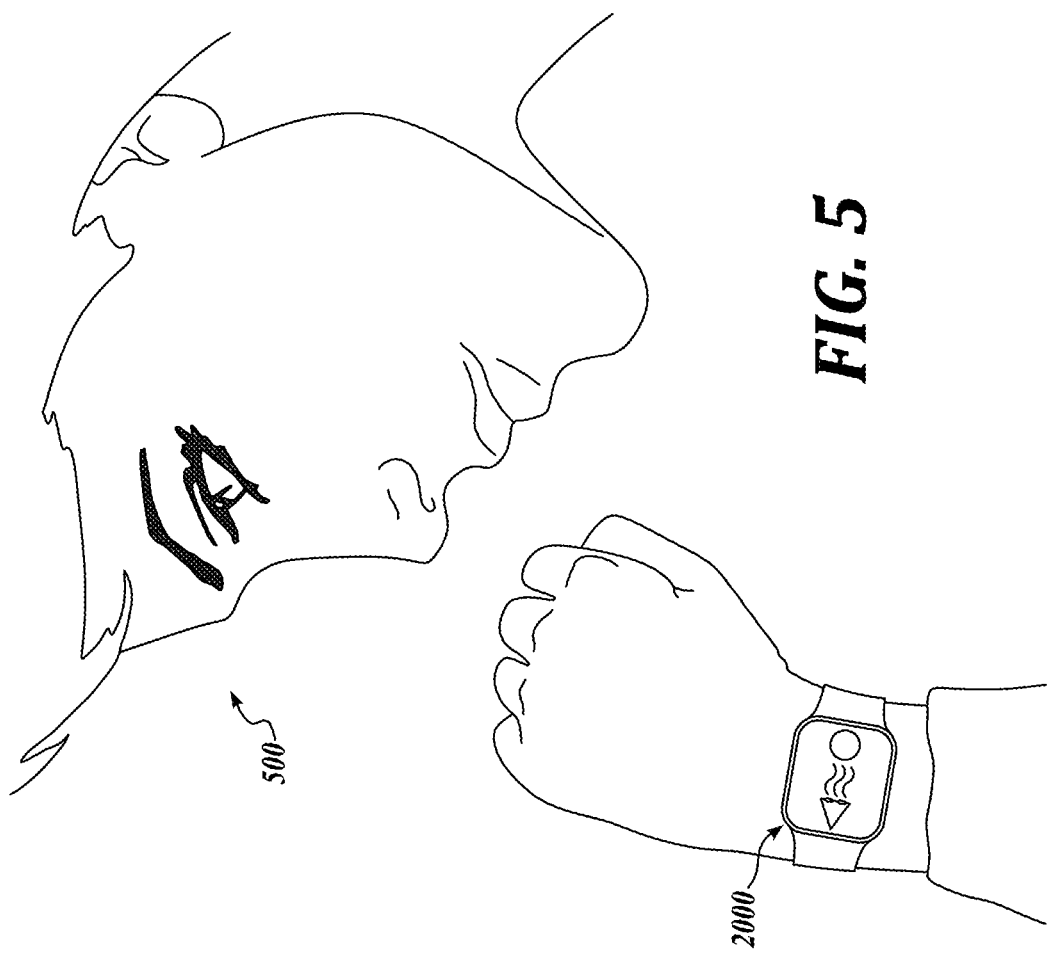
FIG. 5 is an embodiment of an interaction between a subject and a smart device to adaptively control personal scent in accordance with an embodiment of the present technology.

FIG. 5 illustrates an example interaction between a subject 500 and a smart device 2000. The subject 500 may be alerted by the smart device 2000 that his or her scent levels are below that of a target scent level. The subject can then choose to apply or reapply their selected fragrance 400 from the dispensing device 1000. The smart device 2000 may also alert the subject 500 regarding other status, such as the fragrance cartridge 410 being low on selected fragrance 400 or empty.

Figure 6B:
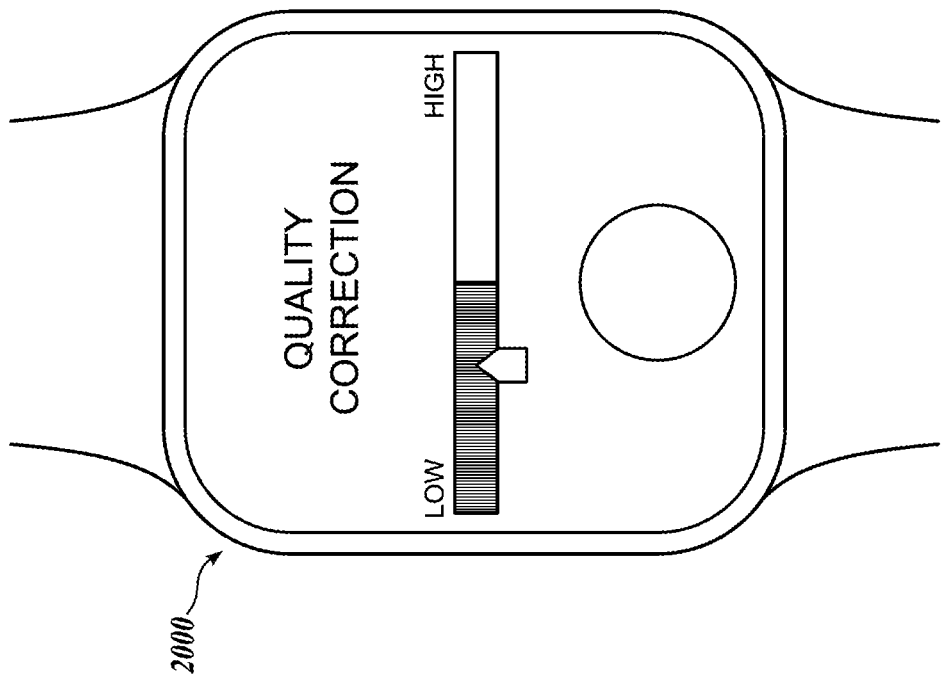
FIG. 6B is an embodiment of a smart device subject interface for adjusting personal scent in accordance with an embodiment of the present technology.
Figure 6A:
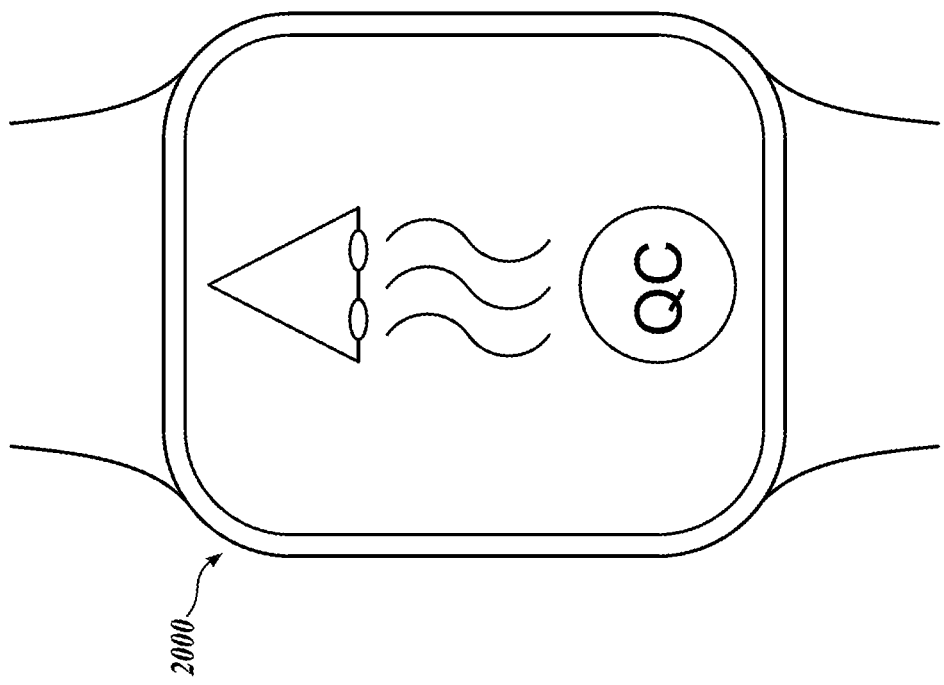
FIG. 6A is an embodiment of a smart device subject interface for alerting the subject in accordance with an embodiment of the present technology.

FIG. 6A is an example interface of the smart device 2000 alerting a subject 500 to a scent level below the target level. For simplicity, the interface has been depicted as an alert icon with a circular button to allow the subject to adjust his or her personal scent. In other embodiments, the interface may consist of different icons or different subject 500 controls. Using the plurality of sensors 340 on the dispensing device 1000 and the smart device 2000, the smart device 2000 alerts the subject 500 to a new condition and gives the subject 500 the ability to correct his or her scent level. For example, the smart device 2000 alerts the subject 500 when the subject's 500 scent has fallen below desired or preset scent levels.

FIG. 6B illustrates an example interface that allows a subject 500 to control his or her scent levels in accordance with the present technology. In operation, the smart device 2000 receives and analyzes data from the plurality of sensors 430 on the dispensing device 1000. The subject 500 can then decide what amount of selected fragrance 400 to dispense or the subject may decide to comply with a recommendation given by the smart device 2000. In some embodiments, after the subject directs the smart device 2000 to apply more selected fragrance 400, the smart device 2000 sends instructions to a controller 350 in the dispensing device 2000 via a wireless connection, and the controller 350 causes the dispensing device 1000 to dispense the selected fragrance 400. The controller 350 may include a non-volatile memory for storing instructions, which, when executed, cause the selected fragrance 400 to be dispensed.

Figure 7A:
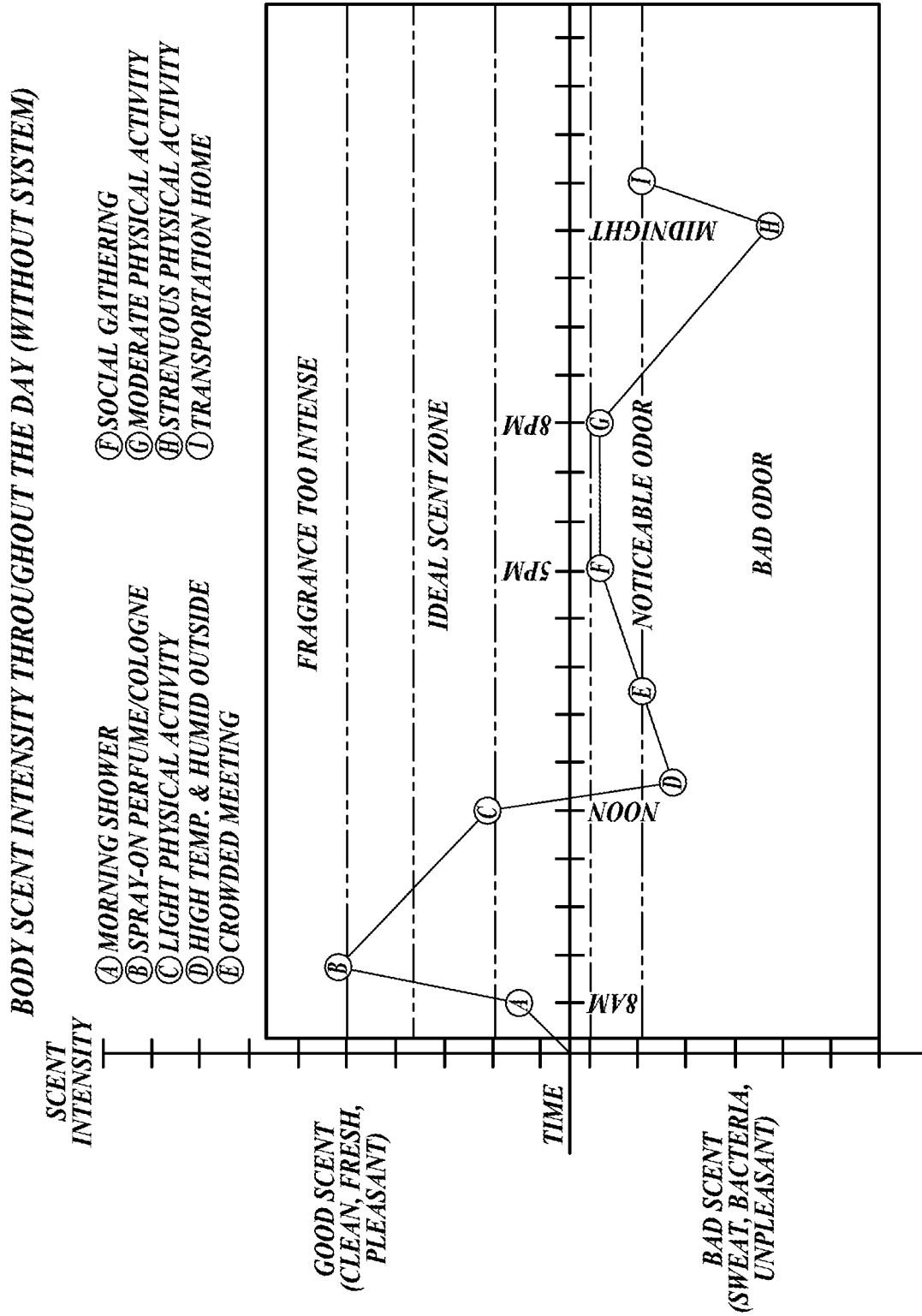
FIG. 7A is a graph of an example subject's personal scent throughout the day in absence of the present technology.

FIGS. 7A-7B are sample graphs depicting how a subject's personal scent changes throughout the day without and with the inventive technology, respectively. The horizontal axis shows time. The vertical axis shows scent intensity. The region below the horizontal axis represents a bad or unpleasant scent. The line below the horizontal time axis ("noticeable odor") demarcates the point at which the intensity of a bad odor is noticeable to others. The region above the horizontal time axis represents a good or clean scent. The region directly above the horizontal axis denotes the 'ideal scent zone' where a subject's personal odor is pleasant, but not overpowering. The region above the ideal scent zone denotes a zone where a subject's personal scent is pleasant, but overpowering, such as when a subject applies too much perfume or cologne.

Example daily events throughout the day are represented by the letters A-I. These sample events are: (A) the subject's shower, (B) the subject applying cologne or perfume, (C) light physical activity, (D) weather factors such as a high temperature and high humidity that affect the subject's personal scent, (E) a crowded meeting, (F) a social gathering, (G) moderate physical activity, (H) strenuous physical activity, and (I) the subject taking transportation to get home. These events show a wide range of activities that might affect a subject's personal odor, but are not exhaustive, and may happen at any time of the day, not at all, or in addition to other events.

FIG. 7A is a sample graph of a subject's personal odor intensity throughout an example day without the inventive technology. First, the subject takes a morning shower (A). This puts the subject's odor in the ideal scent zone. Then, the subject applies spray on perfume or cologne (B) from a conventional bottle. This raises the subject's scent to an overpowering level. Conventional methods for applying perfume and cologne do not consider the personal needs of a subject and provide no convenient metering to adjust how much fragrance to apply. As the subject engages in light physical activity (C), the conventional perfume or cologne he or she applied maintains his or her personal scent, keeping it within the ideal scent zone. However, external elements outside of the subject's control, in this case (D), high temperature and high humidity, push the subject's personal odor into the bad odor region. As the subject attends a crowded meeting (E), a social gathering (F), and engages in moderate physical activity (G), his or her scent levels stay in the bad odor region but are not yet noticeable to other people. Finally, as the subject engages in strenuous physical activity (H), and the subject returns home via a method of transportation (I) the subject's scent drops into the noticeable range and is unpleasant.

As described previously, human's olfactory adaptation makes the users become odor-blind or at least less sensitive to their own body odor if exposed to it for a duration of time. Even if the subject were to reapply conventional perfume or cologne at any point after (B) in the above example day (re-application not shown in FIG. 7A), the subject would not know when to most effectively apply his or her selected fragrance, what intensity of fragrance to apply, or what external factors (i.e. temperature and humidity) and internal factors (i.e. heartrate and baseline fragrance levels) might affect his or her personal scent levels.

FIG. 7B is a graph of a subject's personal odor intensity (also referred to as a scent intensity) throughout a sample day with the inventive technology. In the illustrated embodiment, the subject takes a morning shower (A) putting his or her odor levels within the ideal scent zone. Instead of applying a conventional perfume or cologne, the subject turns on the inventive system at (B). As the subject goes about his or her day, the system keeps the subject's scent within this ideal scent zone, depending at least in part on the activity the subject does, and the external and internal factors that affect a subject's personal odor. By alerting the subject to his or her personal scent, the subject can adjust an optimal scent level throughout the day to reach, even if the subject does not notice his or her own odor.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. For example, in some embodiments the counter or controller may be based on a low-power buck regulator connected to a capacitor. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," etc., mean plus or minus 5% of the stated value.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

What is claimed is:

1. A portable dispensing device configured to be carried by a subject being a user of the portable dispensing device, the device comprising:
    a body having a reservoir;
    a selected fragrance disposed inside the reservoir;
    a dispenser configured to dispense the selected fragrance from the reservoir, thereby applying said fragrance to the subject, in an amount to achieve a preset target scent level of the selected fragrance set by the user, wherein the preset target scent level is achieved by modulating a release rate and a dosage of the selected fragrance from the dispenser;
    a plurality of sensors configured to acquire data related to the subject; and
    a controller configured to activate the dispenser based on the data received from the plurality of sensors, wherein the controller is configured to receive data from the plurality of sensors and to recommend an amount of fragrance to achieve the preset target scent level of the selected fragrance set by the user, and wherein the controller is configured to release an amount of the selected fragrance based on the preset target scent level set by the user, thereby maintaining odor levels of the subject within a predetermined Ideal Scent Zone in response to data related to a scent of the subject determined from the plurality of sensors.

2. A system comprising the dispensing device of claim 1, the system further comprising a smart device in communication with the controller.

3. The dispensing device of claim 1, wherein the reservoir is configured to contain a fragrance cartridge.

4. The dispensing device of claim 1, wherein the selected fragrance is a liquid.

5. The dispensing device of claim 1, wherein the selected fragrance is solid.

6. The dispensing device of claim 1, wherein the plurality of sensors comprises one or more accelerometers, an altimeter, a humidity sensor, a heart rate monitor, a thermometer, a sweat sensor, or a global positioning system (GPS) sensor.

7. The dispensing device of claim 1, wherein the dispenser is a solenoid-controlled sprayer.

8. The dispensing device of claim 1, wherein the dispenser is a vent.

9. The dispensing device of claim 1, further comprising a plurality of levers, configured to adjust the fragrance notes of the selected fragrance.

10. The dispensing device of claim 1, further comprising a heater configured to heat the selected fragrance.

11. The dispensing device of claim 1, further comprising an attachment mechanism for carrying the device.

12. A dispensing device for adjusting personal scent of a user, the device comprising:
    a body having a reservoir;
    a selected fragrance disposed inside the reservoir;
    a dispenser configured to dispense the selected fragrance from the reservoir, thereby applying said fragrance to the user in an amount to achieve a preset target scent level of the selected fragrance set by the user, wherein the preset target scent level is achieved by modulating a release rate and a dosage of the selected fragrance from the dispenser;
    a plurality of sensors configured to generate data based on the user's odor or surroundings; and
    a controller having a non-volatile computer memory with instructions that, when executed, cause the dispenser to release the selected fragrance, wherein the controller is configured to receive data from the plurality of sensors and to recommend an amount of fragrance to achieve the preset target scent level of the selected fragrance set by the user, and wherein the controller is configured to release an amount of the selected fragrance based on the preset target scent level set by the user, thereby maintaining odor levels of the user within a predetermined Ideal Scent Zone in response to data related to a scent of the user determined from the plurality of sensors.

13. A system comprising the dispensing device of claim 12, the system further comprising a smart device communicatively coupled to the controller, wherein the smart device is configured to issue instructions to the controller.

14. The system of claim 13, wherein the dispensing device is a first dispensing device attached at a first location on the user, the system further comprising a second dispensing device attached at a second location on the user.

15. The system of claim 13, wherein the smart device is a smart phone or a smart watch.

16. The dispensing device of claim 12, wherein the plurality of sensors are configured to actively monitor the user and alert the user when fragrance levels drop below a target level.

17. The dispensing device of claim 12, wherein the plurality of sensors comprises a temperature sensor.

18. The dispensing device of claim 12, wherein the plurality of sensors comprises a humidity sensor.

19. The dispensing device of claim 12, wherein the plurality of sensors comprises a fragrance sensor.

20. The dispensing device of claim 12, wherein the plurality of sensors comprises an altimeter.

21. The dispensing device of claim 12, wherein the data from the plurality of sensors are collected over a period of time covering more than one day.

22. A wearable dispensing device, comprising:
a body having a reservoir;
a selected fragrance disposed inside the reservoir;
at least one dispenser configured to dispense the selected fragrance from the reservoir, thereby applying said fragrance to the subject, in an amount to achieve a preset target scent level of the selected fragrance set by the user, wherein the preset target scent level is achieved by modulating a release rate and a dosage of the selected fragrance from the at least one dispenser;
a fragrance unit including processing circuitry operably coupled to a plurality of sensors and the dispenser; and
the plurality of sensors configured to acquire data related to a user;
wherein the fragrance unit is configured to activate the dispenser, wherein the fragrance unit is configured to receive data from the plurality of sensors and to recommend an amount of fragrance to achieve the preset target scent level of the selected fragrance set by the user, and wherein the fragrance unit is configured to release an amount of the selected fragrance based on the preset target scent level set by the user, thereby maintaining odor levels of the user within a predetermined Ideal Scent Zone in response to data related to a scent of the user determined from the plurality of sensors.

23. The wearable dispensing device of claim 22, wherein at least one of the plurality of sensors comprises a sweat sensor, and the fragrance unit is configured to activate at least one dispenser based on a comparison indicative of a change in a sweat state.

24. The wearable dispensing device of claim 22, wherein at least one of the plurality of sensors comprises a capacitive sensor, and the fragrance unit is configured to activate at least one dispenser based on a comparison indicative of a change in a capacitance value.

25. The wearable dispensing device of claim 22, wherein at least one of the plurality of sensors comprises a chemical sensor, and the fragrance unit is configured to activate at least one dispenser based on a comparison indicative of a change in electrolyte or metabolite concentrations.

26. The wearable dispensing device of claim 22, wherein at least one of the plurality of sensors comprises a capacitive humidity sensor, and the fragrance unit is configured to activate at least one dispenser based on a comparison indicative of a change in a sweat rate.

27. The wearable dispensing device of claim 22, wherein the fragrance unit is configured to activate at least one dispenser based on a comparison indicative of a change in an ion concentration.

28. The wearable dispensing device of claim 22, wherein the fragrance unit is configured to activate at least one dispenser based on a comparison indicative of a change in an electrolyte or metabolite concentration.

29. The wearable dispensing device of claim 22, wherein at least one of the plurality of sensors comprises a skin pH sensor, and the fragrance unit is configured to activate at least one dispenser based on a comparison indicative of a change in a skin pH value.

30. The wearable dispensing device of claim 22, wherein at least one of the plurality of sensors comprises an electronic nose (e-Nose) sensor, and the fragrance unit is configured to activate at least one dispenser based on a comparison indicative of a change in a sweat constituent.

* * * * *